United States Patent
Zhang et al.

(10) Patent No.: US 9,225,815 B2
(45) Date of Patent: Dec. 29, 2015

(54) METHOD AND DEVICE FOR LOUDNESS LEVEL DETERMINATION

(71) Applicant: Motorola Mobility LLC, Libertyville, IL (US)

(72) Inventors: Wen Hao Zhang, Lake Villa, IL (US); Prabhu Anabathula, Gurnee, IL (US); Jonathan E Eklund, Libertyville, IL (US); Adrian M Schuster, West Olive, MI (US); Andrew K Wells, Lindenhurst, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 55 days.

(21) Appl. No.: 14/142,260

(22) Filed: Dec. 27, 2013

(65) Prior Publication Data

US 2015/0031419 A1 Jan. 29, 2015

Related U.S. Application Data

(60) Provisional application No. 61/891,934, filed on Oct. 17, 2013, provisional application No. 61/857,696, filed on Jul. 23, 2013.

(51) Int. Cl.
- *H04M 1/00* (2006.01)
- *H04M 1/60* (2006.01)
- *G10L 13/04* (2013.01)
- *G06F 3/16* (2006.01)

(52) U.S. Cl.
CPC .............. *H04M 1/6041* (2013.01); *G06F 3/165* (2013.01); *G10L 13/04* (2013.01)

(58) Field of Classification Search
CPC .......... H04M 19/044; H04M 1/72569; H04M 2250/12; H04M 1/6016; H04M 19/047; H04M 19/048; H04M 2250/10; H04M 19/04; H04M 1/22; H04M 1/72577; H04M 2250/52; H04M 9/082; H04M 1/00; H04M 1/05; H04M 1/60; H04M 1/6066; H04M 1/72522
See application file for complete search history.

(56) References Cited

U.S. PATENT DOCUMENTS

| | | | |
|---|---|---|---|
| 6,988,068 B2 * | 1/2006 | Fado et al. | 704/225 |
| 2009/0003538 A1 * | 1/2009 | Sharpe et al. | 379/70 |
| 2009/0005891 A1 | 1/2009 | Batson et al. | |
| 2011/0103598 A1 * | 5/2011 | Fukui et al. | 381/57 |
| 2012/0291053 A1 | 11/2012 | Carter | |
| 2013/0165178 A1 * | 6/2013 | Lee | 455/550.1 |

FOREIGN PATENT DOCUMENTS

| | | |
|---|---|---|
| WO | 2004086358 A1 | 10/2004 |
| WO | 2012/166319 A1 | 12/2012 |

OTHER PUBLICATIONS

International Search Report and Written Opinion for International Application No. PCT/US2014/047881, mailed Nov. 18, 2014, 10 pages.
App Idea: TTS Volume control in relation to other volumes (text to speech), http://forum.xda-developers.com/showthread.php?t=2231315, Apr. 12, 2013, all pages.
Navigation volume is lower than media volume, https://code.google.com/p/android/issues/detail?id=34592, Jul. 15, 2012, all pages.

* cited by examiner

*Primary Examiner* — Harry S Hong
*Assistant Examiner* — Golam Sorowar
(74) *Attorney, Agent, or Firm* — Shumaker & Sieffert, P.A.

(57) ABSTRACT

A method on a mobile device for providing an audio output to a user at a determined loudness level is described. A text input is received. A loudness level of an audio output, corresponding to the text input, is determined based on a volume setting of the mobile device and a non-linear adjustment of the volume setting. The audio output is provided to an audio output component at the determined loudness level.

17 Claims, 6 Drawing Sheets

400

METHOD AND DEVICE FOR LOUDNESS LEVEL DETERMINATION

CROSS-REFERENCE TO RELATED APPLICATIONS

The present application claims priority to U.S. Provisional Patent Application 61/891,934, filed Oct. 17, 2013 and to U.S. Provisional Patent Application 61/857,696, filed Jul. 23, 2013, the contents of all of which are hereby incorporated by reference herein.

TECHNICAL FIELD

The present disclosure relates to processing audio signals and, more particularly, to methods and devices for volume control of audio output.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS, strictly by voice.

When speaking to provide an input or command, a user of a mobile device does not generally interact physically with the buttons or touch-screen display of the mobile device. For example, the mobile device may be located nearby on a table or in a cupholder or tray of an automobile console. In this case, the user often prefers to receive feedback to their command in the same manner, e.g., audio feedback. Software or applications (e.g., "apps") on a mobile device use a text-to-speech engine that provides generated speech as an audio output based on a text input; however, these apps use default volume settings for playback on the mobile device which may not provide sufficient volume for the user to hear the audio output.

Output volumes of a mobile device may be inconsistent with the various components of the device. For volume control, volume adjustment may be confusing to the user due to the fact that volume keys may control different types of volume based on a current context. Also, the output volumes of the mobile device may be difficult to hear in certain environments. For example, audio output of a mobile device, particularly audible speech, may be difficult to hear when the volume level is set to a low level. This is particularly evident in noisier environments, such as the interior of a moving vehicle where road and wind noise may be present.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
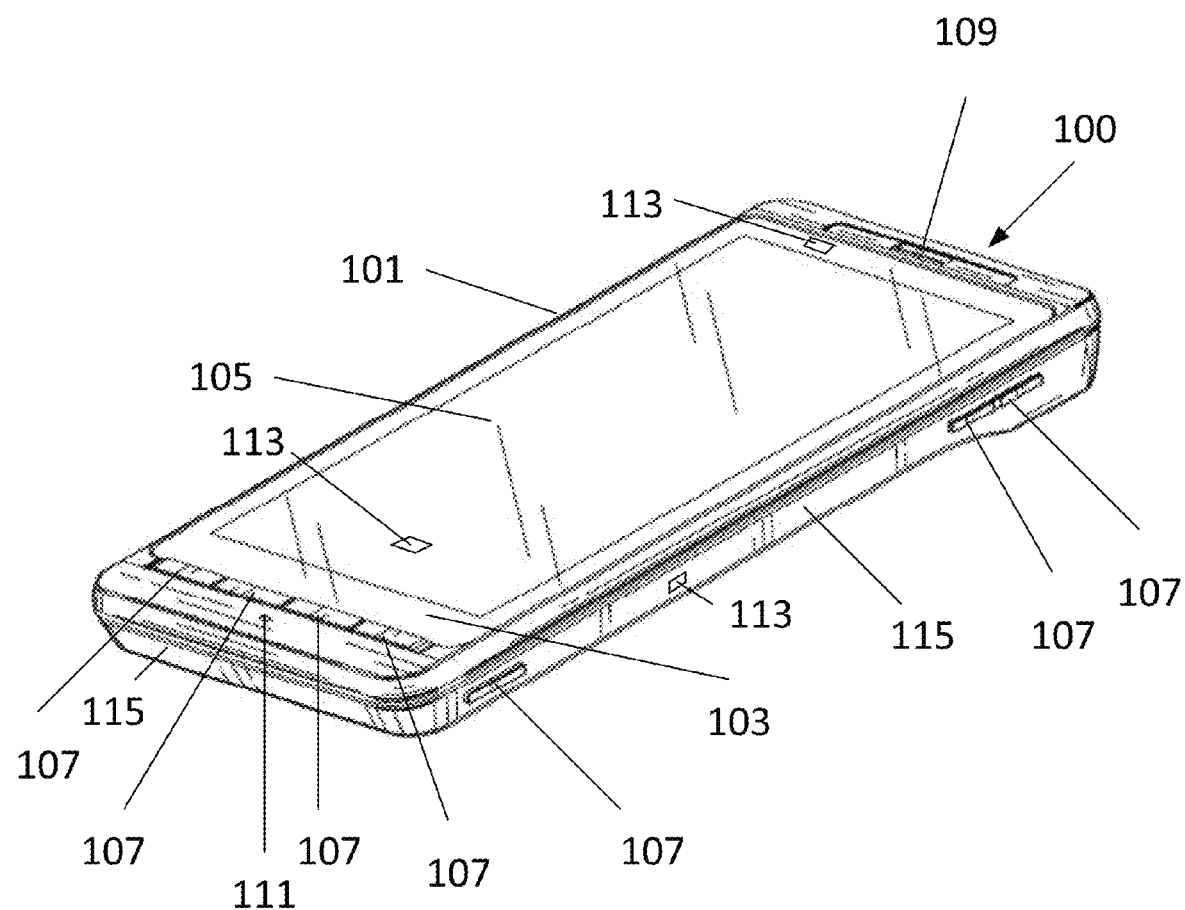
FIG. 1 is a block diagram illustrating a mobile device, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

In order to provide a text-to-speech audio output, a mobile device receives a text input from an input source, such as an application, service, or process. The input source is associated with a default audio gain map that the mobile device may use to determine a loudness level for the audio output. The default audio gain map often corresponds to a "media" volume setting of the mobile device. For certain input sources, the mobile device overrides the default audio gain map and uses an alternate audio gain map. The alternate audio gain map is selected to provide a loudness level that is more easily heard by the user. The mobile device uses the alternate audio gain map for one or more predetermined input sources, such as those that provide navigation information, notification information, or alert information.

The input source is associated with an input source identifier, such as a process identifier; however, the process identifier may be different for each instantiation of the input source and is often not known when the predetermined input sources are identified. The mobile device determines a persistent application identifier based on the process identifier. The mobile device then performs a lookup in an audio mapping table to determine whether the persistent application identifier corresponds to one of the predetermined input sources. The mobile device selects the audio gain map based on the persistent application identifier. The mobile device then determines the loudness level based on a volume setting of the mobile device and the selected audio gain map.

The various embodiments described herein allow a mobile device to provide an audio output at a determined loudness level. The mobile device determines the loudness level based on a volume setting and a non-linear adjustment of the volume setting. The non-linear adjustment in one example is an alternate audio gain map. The mobile device selects the alternate audio gain map based on an input source identifier.

Referring to FIG. 1, there is illustrated a perspective view of an example mobile device 100. The mobile device 100 may be any type of device capable of storing and executing multiple applications. Examples of the mobile device 100 include, but are not limited to, mobile devices, smart phones, smart watches, wireless devices, tablet computing devices, personal digital assistants, personal navigation devices, touch screen input device, touch or pen-based input devices, portable video and/or audio players, and the like. It is to be understood that the mobile device 100 may take the form of a variety of form factors, such as, but not limited to, bar, tablet, flip/clam, slider, rotator, and wearable form factors.

For one embodiment, the mobile device 100 has a housing 101 comprising a front surface 103 which includes a visible display 105 and a user interface. For example, the user interface may be a touch screen including a touch-sensitive surface that overlays the display 105. For another embodiment, the user interface or touch screen of the mobile device 100 may include a touch-sensitive surface supported by the housing 101 that does not overlay any type of display. For yet another embodiment, the user interface of the mobile device 100 may include one or more input keys 107. Examples of the input key or keys 107 include, but are not limited to, keys of an alpha or numeric keypad or keyboard, a physical keys, touch-sensitive surfaces, mechanical surfaces, multipoint directional keys and side buttons or keys 107. The mobile device 100 may also comprise a speaker 109 and microphone 111 for audio output and input at the surface. It is to be understood that the mobile device 100 may include a variety of different combination of displays and interfaces.

The mobile device 100 includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101. The sensor or sensors 113 may include an exterior sensor supported at the exterior boundary to detect an environmental condition associated with an environment external to the housing. The sensor or sensors 113 may also, or in the alternative, include an interior sensors supported within the exterior boundary (i.e., internal to the housing) to detect a condition of the device itself. Examples of the sensors 113 are described below in reference to FIG. 2.

Figure 2:
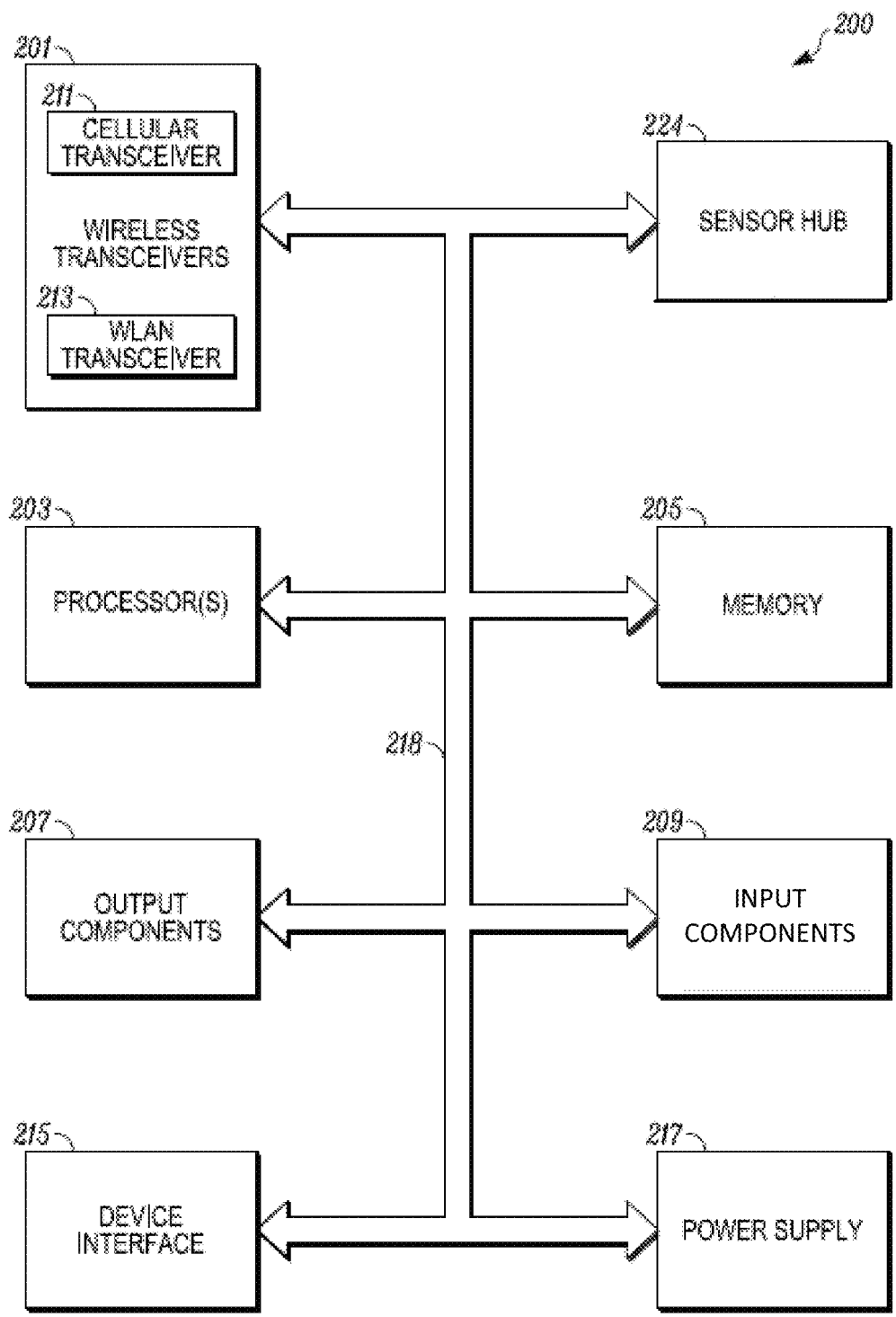
FIG. 2 is a block diagram of example components of a mobile device, according to an embodiment.

Referring to FIG. 2, there is shown a block diagram representing example components (e.g., internal components) 200 of the mobile device 100 of FIG. 1. In the present embodiment, the components 200 include one or more wireless transceivers 201, one or more processors 203, one or more memories 205, one or more output components 207, and one or more input components 209. As already noted above, the mobile device 100 includes a user interface, including the touch screen display 105 that comprises one or more of the output components 207 and one or more of the input components 209. Also as already discussed above, the mobile device 100 includes a plurality of the sensors 113, several of which are described in more detail below. In the present embodiment, the sensors 113 are in communication with (so as to provide sensor signals to or receive control signals from) a sensor hub 224.

Further, the components 200 include a device interface 215 to provide a direct connection to auxiliary components or accessories for additional or enhanced functionality. In addition, the internal components 200 include a power source or supply 217, such as a portable battery, for providing power to the other internal components and allow portability of the mobile device 100. As shown, all of the components 200, and particularly the wireless transceivers 201, processors 203, memories 205, output components 207, input components 209, sensor hub 224, device interface 215, and power supply 217, are coupled directly or indirectly with one another by way of one or more internal communication link(s) 218 (e.g., an internal communications bus).

Further, in the present embodiment of FIG. 2, the wireless transceivers 201 particularly include a cellular transceiver 211 and a Wi-Fi transceiver 213. Although in the present embodiment the wireless transceivers 201 particularly include two of the wireless transceivers 211 and 213, the present disclosure is intended to encompass numerous embodiments in which any arbitrary number of (e.g., more than two) wireless transceivers employing any arbitrary number of (e.g., two or more) communication technologies are present. More particularly, in the present embodiment, the cellular transceiver 211 is configured to conduct cellular communications, such as 3G, 4G, 4G-LTE, vis-à-vis cell towers (not shown), albeit in other embodiments, the cellular transceiver 211 can be configured to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.) or variants thereof.

By contrast, the Wi-Fi transceiver 213 is a wireless local area network (WLAN) transceiver configured to conduct Wi-Fi communications in accordance with the IEEE 802.11 (a, b, g, or n) standard with access points. In other embodiments, the Wi-Fi transceiver 213 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 213 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Although in the present embodiment each of the wireless transceivers 201 serves as or includes both a respective transmitter and a respective receiver, it should be appreciated that the wireless transceivers are also intended to encompass one or more receiver(s) that are distinct from any transmitter(s), as well as one or more transmitter(s) that are distinct from any receiver(s). In one example embodiment encompassed herein, the wireless transceiver 201 includes at least one receiver that is a baseband receiver.

Exemplary operation of the wireless transceivers 201 in conjunction with others of the components 200 of the mobile device 100 can take a variety of forms and can include, for example, operation in which, upon reception of wireless signals (as provided, for example, by remote device(s)), the internal components detect communication signals and the transceivers 201 demodulate the communication signals to recover incoming information, such as voice or data, transmitted by the wireless signals. After receiving the incoming information from the transceivers 201, the processors 203 format the incoming information for the one or more output components 207. Likewise, for transmission of wireless signals, the processors 203 format outgoing information, which can but need not be activated by the input components 209, and convey the outgoing information to one or more of the wireless transceivers 201 for modulation so as to provide modulated communication signals to be transmitted. The wireless transceiver(s) 201 convey the modulated communication signals by way of wireless (as well as possibly wired) communication links to other devices (e.g., remote devices). The wireless transceivers 201 in one example allow the mobile device 100 to exchange messages with remote devices, for example, a remote network entity (not shown) of a cellular network or WLAN network. Examples of the remote network entity include an application server, web server, database server, or other network entity accessible through the wireless transceivers 201 either directly or indirectly via one or more intermediate devices or networks (e.g., via a WLAN access point, the Internet, LTE network, or other network).

Depending upon the embodiment, the output and input components 207, 209 of the components 200 can include a variety of visual, audio, or mechanical outputs. For example, the output device(s) 207 can include one or more visual output devices such as a cathode ray tube, liquid crystal display, plasma display, video screen, incandescent light, fluorescent light, front or rear projection display, and light emitting diode indicator, one or more audio output devices such as a speaker, alarm, or buzzer, or one or more mechanical output devices such as a vibrating mechanism or motion-based mechanism. Likewise, by example, the input device(s) 209 can include one or more visual input devices such as an optical sensor (for example, a camera lens and photosensor), one or more audio input devices such as a microphone, and one or more mechanical input devices such as a flip sensor, keyboard, keypad, selection button, navigation cluster, touch pad, capacitive sensor, motion sensor, and switch.

As already noted, the various sensors 113 in the present embodiment can be controlled by the sensor hub 224, which can operate in response to or independent of the processor(s) 203. Examples of the various sensors 113 may include, but are not limited to, power sensors, temperature sensors, pressure sensors, moisture sensors, ambient noise sensors, motion sensors (e.g., accelerometers or Gyro sensors), light sensors, proximity sensors (e.g., a light detecting sensor, an ultrasound transceiver or an infrared transceiver), other touch sensors, altitude sensors, one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 100.

With respect to the processor(s) 203, the processor(s) can include any one or more processing or control devices such as, for example, a microprocessor, digital signal processor, microcomputer, application-specific integrated circuit, etc. The processors 203 can generate commands, for example, based on information received from the one or more input components 209. The processor(s) 203 can process the received information alone or in combination with other data, such as information stored in the memories 205. Thus, the memories 205 of the components 200 can be used by the processors 203 to store and retrieve data.

Further, the memories (or memory portions) 205 of the components 200 can encompass one or more memory devices of any of a variety of forms (e.g., read-only memory, random access memory, static random access memory, dynamic random access memory, etc.), and can be used by the processors 203 to store and retrieve data. In some embodiments, one or more of the memories 205 can be integrated with one or more of the processors 203 in a single device (e.g., a processing device including memory or processor-in-memory (PIM)), albeit such a single device will still typically have distinct portions/sections that perform the different processing and memory functions and that can be considered separate devices. The data that is stored by the memories 205 can include, but need not be limited to, operating systems, applications, and informational data.

Each operating system includes executable code that controls basic functions of the mobile device 100, such as interaction among the various components included among the components 200, communication with external devices or networks via the wireless transceivers 201 or the device interface 215, and storage and retrieval of applications and data, to and from the memories 205. Each application includes executable code that utilizes an operating system to provide more specific functionality, such as file system service and handling of protected and unprotected data stored in the memories 205. Such operating system or application information can include software update information (which can be understood to potentially encompass updates to either application(s) or operating system(s) or both). As for informational data, this is non-executable code or information that can be referenced or manipulated by an operating system or application for performing functions of the mobile device 100.

It is to be understood that FIG. 2 is provided for illustrative purposes only and for illustrating components of an mobile device in accordance with various embodiments, and is not intended to be a complete schematic diagram of the various components required for an mobile device. Therefore, an mobile device can include various other components not shown in FIG. 2, or can include a combination of two or more components or a division of a particular component into two or more separate components, and still be within the scope of the disclosed embodiments.

Figure 3B:
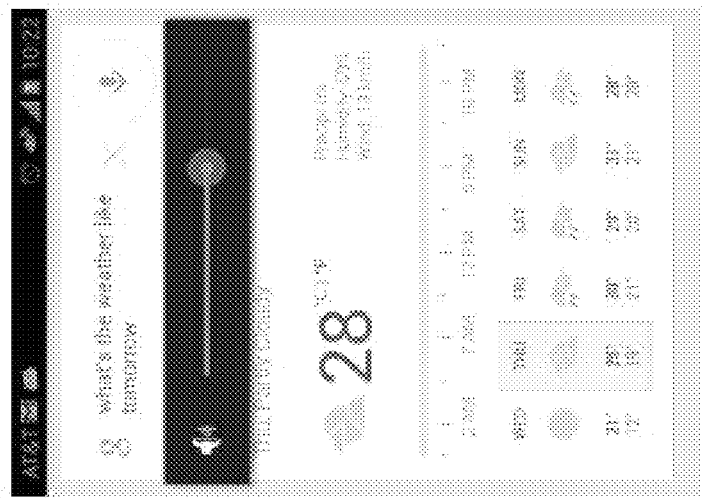
FIGS. 3A and 3B are planar views of an example user interface illustrating different responses to a volume control request.
Figure 3B:
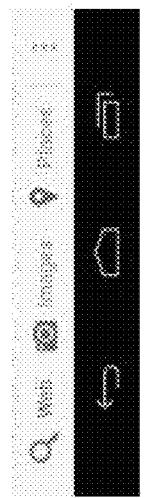
Figure 3A:
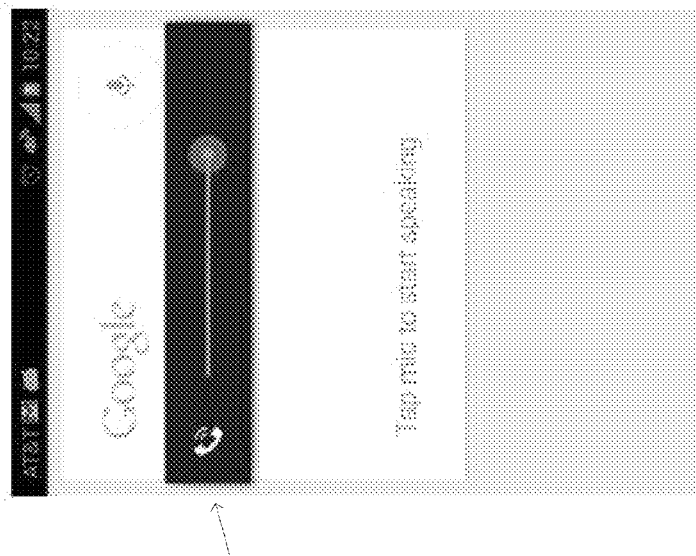
Figure 3A:
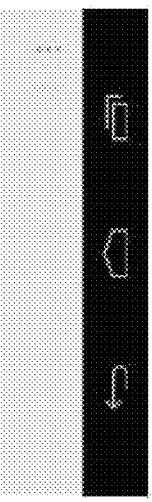

Turning to FIGS. 3A and 3B, views 310 and 320 illustrate example user interfaces for the mobile device 100 in response to a volume control request. The volume control request occurs when the user of the mobile device 100 presses an input key 107 or provides a user input that corresponds to a desired increase or decrease in volume. The mobile device 100 has a set of volume settings, such as a ringer volume setting, a media volume setting, a notification volume setting, or an alarm volume setting. The volume settings in one example are a set of discrete values, such as integer values from one (a lowest volume setting) to fifteen (a highest volume setting). Many applications and services on mobile devices use a default volume setting for a playback request for text-to-speech audio output, such as a media volume setting. The mobile device 100 maps the volume setting to a corresponding audio gain map to determine a loudness level for the audio output. For example, the mobile device 100 maps the media volume setting (e.g., an integer value of 4) to a media audio gain map to determine the loudness level.

In response to the volume control request, the mobile device 100 selects and adjusts one of the set of volume settings. On a subsequent playback, the mobile device 100 maps the adjusted volume setting to the audio gain map to determine the loudness level. The mobile device 100 selects the volume setting for adjustment differently based on when the volume control request is received. View 310 illustrates a user interface when the volume control request is received prior to a playback of a text-to-speech audio output by the mobile device 100. In this case, the mobile device 100 selects the ringer volume setting for adjustment, as indicated by a "phone ringing" icon 312. View 320 illustrates a user interface when the volume control request is received during playback of the text-to-speech audio output by the mobile device 100. In this case, the mobile device 100 selects the media volume setting for adjustment, as indicated by a "speaker" icon 322.

The user may have difficulty reaching the mobile device 100 during the playback of the text-to-speech audio output to provide a user input that adjusts the volume of the text-to-speech audio output. If the user input is not timed correctly, the mobile device 100 adjusts the ringer volume setting instead of the media volume setting and a subsequent text-to-speech audio output will be at an unchanged loudness level. Additionally, the media volume setting and corresponding audio gain map may not be sufficiently loud at lower volume settings. As described herein, the mobile device 100 in one example is configured to use the ringer volume setting and an alternate audio gain map for text-to-speech audio output.

Figure 4:
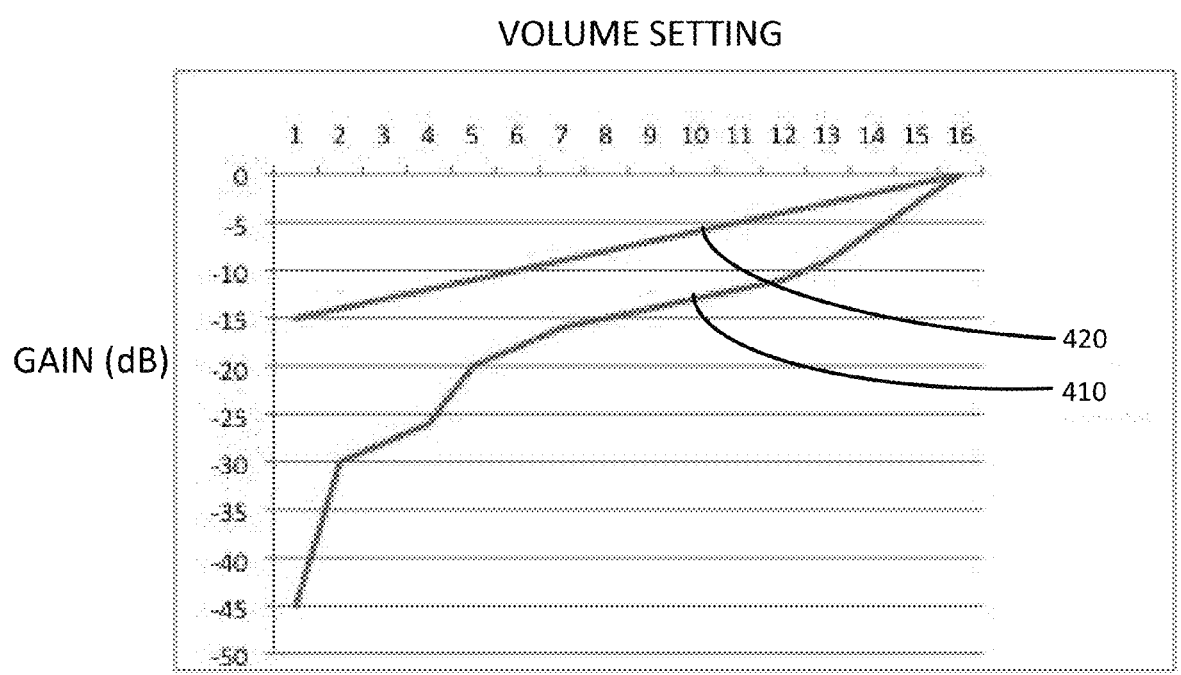
FIG. 4 is a chart that illustrates two example audio gain maps that may be used by the mobile device of FIG. 1, according to an embodiment.

Turning to FIG. 4, a chart 400 illustrates a first audio gain map 410 and a second audio gain map 420. The audio gain maps 410 and 420 are shown as a curve representing a gain in decibels along the Y-axis and the volume setting along the X-axis. While only sixteen volume settings are shown, other implementations of the mobile device 100 may have higher or lower numbers of volume settings. The first audio gain map 410 in one example corresponds to a media audio gain map that corresponds to the media volume setting (e.g., the default audio gain map and volume setting for text-to-speech audio output) for the mobile device 100. The second audio gain map 420 corresponds to an alternate audio gain map. The second audio gain map 420 is selected by the mobile device 100 to provide a loudness level that is more easily heard by the user, even at low or "zero" volume settings. The mobile device 100 is configured to select the alternate audio gain map based on an input source identifier, as described herein. In one example, the mobile device 100 is configured to select a "TTS Stream" of the Android operating system for the alternate audio gain map.

As shown in FIG. 4, the second audio gain map 420 includes approximately 1 dB incremental steps from a lowest gain level of −15 dB and increasing to 0 dB. Alternative implementations of the second audio gain map 420 will be apparent to those skilled in the art. For example, while the audio gain maps are shown as a curve, in other implementations the audio gain map is represented by a function or algorithm. In yet other implementations, the audio gain map is represented by a table with one numeric loudness level per volume setting.

Figure 5:
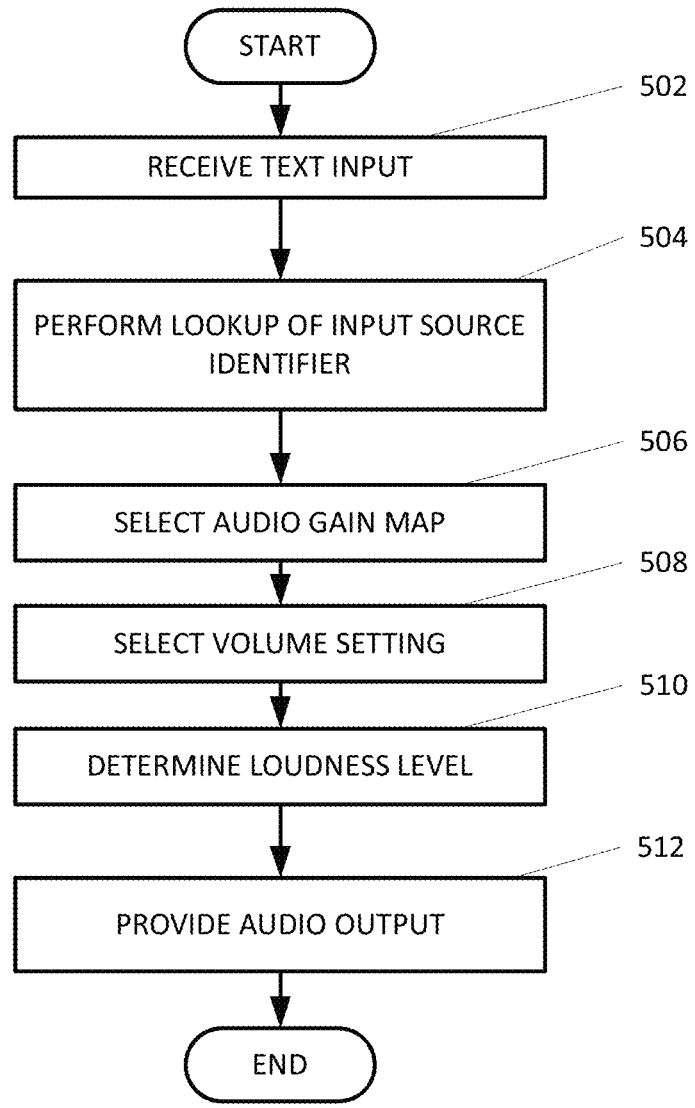
FIG. 5 illustrates a process flow of a method for providing an audio output that may be performed by the mobile device of FIG. 1, according to an embodiment.

Turning to FIG. 5, a process flow 500 illustrates a method for determining a loudness level of an audio output corresponding to a text input (e.g., a speech-to-text audio output) that may be performed by the mobile device 100. The mobile device 100 receives (502) a text input from an input source. Examples of the input source include an application, service, thread, or process. The input source is associated with an input source identifier, such as a process identifier. The process identifier is generally assigned by a "kernel" of the mobile device 100 and may be different for each instantiation of the input source. In other implementations, the process identifier changes when the mobile device 100 is rebooted.

The mobile device 100 performs a lookup (504) of the process identifier to determine a persistent application identifier that corresponds to the input source. The mobile device 100 in one example performs the lookup with a kernel or operating system component of the mobile device 100. The persistent application identifier in one example is an application name, service name, application type, service type, or other identifier that is persistent across instantiations of the input source. The persistent application identifier in one example is a unique application name, such as "com.google.app.MyNavigationApp", that is persistent across multiple versions and instantiations of the application.

The mobile device 100 selects (506) an alternate audio gain map based on the input source identifier. The alternate audio gain map is distinct from the default audio gain map, thus providing a different loudness level. In one example, the mobile device 100 selects (506) the second gain map 420 based on the persistent application identifier that corresponds to the input source identifier. In this case, the mobile device 100 performs a lookup of the persistent application identifier in an audio mapping table of application identifiers. The audio mapping table contains persistent application identifiers for one or more predetermined input sources, such as those that provide navigation information, notification information, or alert information.

The mobile device 100 optionally selects (508) a volume setting, from the set of volume settings, for the audio output based on the persistent application identifier. The mobile device 100 then determines (510) a loudness level for the audio output based on the selected audio gain map and the selected volume setting. The mobile device 100 provides (512) the audio output at the determined loudness level to an audio output component (e.g., the speaker 109). In one example, the mobile device 100 selects the default volume setting for the input source. In this case, the mobile device 100 maps the default volume setting to the second audio gain map 420 instead of to the default audio gain map. In another example, the mobile device 100 selects the volume setting based on the persistent application identifier. In this case, the mobile device 100 maps an alternate volume setting to the second audio gain map 420. The mobile device 100 in one example selects the ringer volume setting as the alternate volume setting. This allows the user to change the ringer volume and simultaneously affect the volume of the text-to-speech audio output and reduces the importance of timing the user input for the volume control request. In another example, the mobile device 100 is configured to use the volume setting that corresponds to the alternate audio gain map (e.g., a STREAM TTS volume setting). In this case, the mobile device 100 aligns the STREAM TTS volume setting with the ringer volume setting. Other combinations of audio gain maps and volume settings will be apparent to those skilled in the art.

The audio mapping table in one example contains a mapping of persistent application identifiers to both audio gain maps and volume settings for determination of the loudness level. The mobile device 100 in one example dynamically updates the audio mapping table, for example, based on received updates from an external server or in response to a request from the input source.

Figure 6:
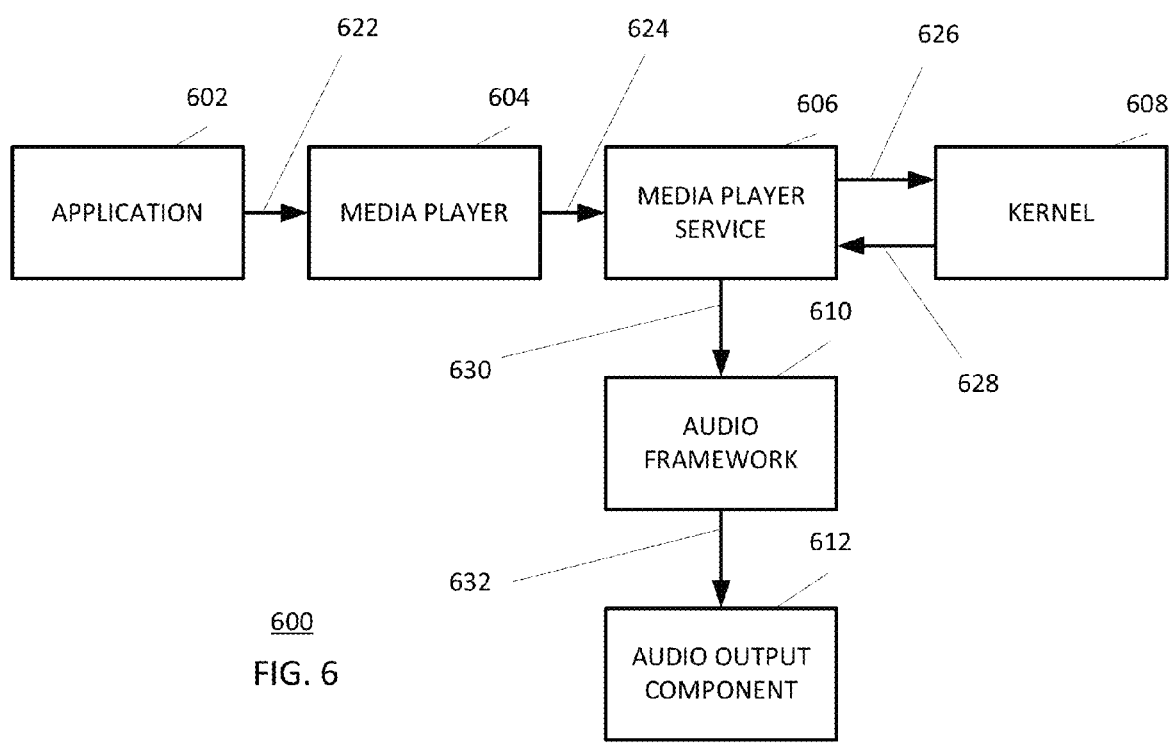
FIG. 6 is a block diagram illustrating an application framework that may be implemented by the mobile device of FIG. 1 for the process flow of FIG. 5.

Turning to FIG. 6, the mobile device 100 in one embodiment implements an application framework 600 for the process flow 500. In one example, the application framework 600 is based on the Android application programming interface provided by Google, Inc. (Mountain View, Calif.; http://developer.android.com/reference/packages.html). The application framework 600 comprises an application 602, a media player component 604, a media player service 606, a kernel 608, an audio framework 610, and an audio output component 612. In the example shown, the application 602 corresponds to the input source. The application 602 includes at least one process with a corresponding process identifier. The application 602 sends (622) a request with a text input to the media player component 604. The media player component 604 sends (624) the request to the media player service 606. The request includes a process identifier of the application 602 and the text input.

The media player service 606 sends (626) a request, with the process identifier of the application 602, to the kernel 608 to perform a lookup of an application name (e.g., the persistent application identifier). The kernel 608 returns (628) the application name to the media player service 606. The media player service 606 is configured to select the alternate audio gain map based on the application name. The media player service 606 converts the text input to an audio output, for example, using a text-to-speech engine. The media player 606 provides (630) the audio output and an audio gain map identifier to the audio framework 610. The audio framework 610 maps the volume setting that corresponds to the audio gain map indicated by the audio gain map identifier to determine a loudness level for the audio output. The audio framework 610 provides (632) the audio output at the determined loudness level to the audio output component 612.

It can be seen from the foregoing that a method and system for providing an audio output with a determined loudness level have been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A method comprising:
   receiving, by a mobile device, a text input from an application, wherein the application corresponds to an input source identifier;
   determining, by the mobile device and based on the input source identifier, a persistent application identifier associated with the application, wherein the persistent application identifier is different from the input source identifier, and wherein the persistent application identifier is persistent across multiple instantiations of the application;
   selecting, by the mobile device and based on the persistent application identifier, an audio gain map from a plurality of selectable audio gain maps;
   selecting, by the mobile device, a volume setting of a plurality of volume settings;
   determining, by the mobile device and based on the volume setting and the audio gain map, a loudness level of an audio output corresponding to the text input, wherein determining the loudness level comprises mapping the volume setting to the loudness level based on the audio gain map; and
   providing, by the mobile device, the audio output to an audio output component at the loudness level.

2. The method of claim 1, wherein the plurality of selectable audio gain maps comprises a default audio gain map, and wherein the audio gain map comprises an alternate audio gain map distinct from the default audio gain map.

3. The method of claim 2, wherein the input source identifier comprises a process identifier, wherein determining the persistent application identifier comprises determining the persistent application identifier based on the process identifier, and wherein selecting the audio gain map comprises selecting the alternate audio gain map based on a lookup of the persistent application identifier in an audio mapping table of application identifiers.

4. The method of claim 3, further comprising dynamically updating the audio mapping table.

5. The method of claim 3, wherein the persistent application identifier comprises at least one of an application type, an application name, a service type, or a service name.

6. The method of claim 2, wherein selecting the volume setting comprises selecting the volume setting from a set of volume settings based on the input source identifier.

7. The method of claim 6, wherein the text input corresponds to a default volume setting of the set of volume settings, wherein selecting the volume setting comprises selecting an alternate volume setting from the set of volume settings based on the input source identifier, and wherein the alternate volume setting is distinct from the default volume setting.

8. The method of claim 6, wherein the set of volume settings comprises at least one of a ringer volume setting, a media volume setting, a notification volume setting, or an alarm volume setting.

9. The method of claim 6, wherein selecting the volume setting comprises selecting a ringer volume setting based on the input source identifier, and wherein selecting the audio gain map comprises selecting a STREAM_TTS audio gain map.

10. The method of claim 6, wherein the input source identifier comprises a process identifier, wherein determining the persistent application identifier comprises determining the persistent application identifier based on the process identifier, and wherein selecting the audio gain map comprises selecting the alternate audio gain map based on a lookup of the persistent application identifier in an audio mapping table of application identifiers.

11. The method of claim 1, wherein the persistent application identifier comprises unique application name associated with the application.

12. A mobile device, comprising:
a non-transitory memory; and
at least one processor configured to retrieve instructions from the memory, wherein the at least one processor is configured to:
receive a text input from an application, wherein the application corresponds to an input source identifier;
determine, based on the input source identifier, a persistent application identifier associated with the application, wherein the persistent application identifier is different from the input source identifier, and wherein the persistent application identifier is persistent across multiple instantiations of the application;
select, based on the persistent application identifier, an audio gain map from a plurality of selectable audio gain maps;
select a volume setting of a plurality of volume settings;
determine, based on the volume setting and the audio gain map, a loudness level of an audio output corresponding to the text input, wherein determining the loudness level comprises mapping the volume setting to the loudness level based on the audio gain map; and
provide the audio output to an audio output component at the loudness level.

13. The mobile device of claim 12, wherein the plurality of selectable audio gain maps comprises a default audio gain map, and wherein the audio gain map comprises an alternate audio gain map distinct from the default audio gain map.

14. The mobile device of claim 13, wherein the input source identifier comprises a process identifier, wherein the at least one processor is configured to determine the persistent application identifier based on the process identifier, and wherein the at least one processor is configured to select the alternate audio gain map based on a lookup of the persistent application identifier in an audio mapping table of application identifiers.

15. The mobile device of claim 13, wherein the text input corresponds to a default volume setting of a set of volume settings for the mobile device, wherein the at least one processor is configured to select an alternate volume setting from the set of volume settings based on the input source identifier, wherein the alternate volume setting is distinct from the default volume setting.

16. The mobile device of claim 15, wherein the at least one processor is configured to select a ringer volume setting as the alternate volume setting based on the input source identifier, and wherein the at least one processor is configured to select a STREAM_TTS audio gain map as the alternate audio gain map.

17. The mobile device of claim 12, wherein the persistent application identifier comprises unique application name associated with the application.

* * * * *